J. M. Albertson.
Horse Power.

N° 103,821. Patented Jun. 7, 1870.

Witnesses:
H. J. Crocker
N. G. Richards.

Inventor:
Jas. M. Albertson

United States Patent Office.

JAMES M. ALBERTSON, OF NEW LONDON, CONNECTICUT.

Letters Patent No. 103,821, dated June 7, 1870; antedated May 30, 1870.

IMPROVEMENT IN THE CONSTRUCTION OF HORSE-POWER FOR COTTON-GINS, &c.

The Schedule referred to in these Letters Patent and making part of the same.

Be it known that I, JAMES M. ALBERTSON, of the town and county of New London, State of Connecticut, have invented a new and useful Improvement in the Method of Constructing Cotton-Gin Houses; and I do hereby declare that the following is a full, clear, and exact description of the same, reference being had to the accompanying drawings forming a part of this specification and to letters of reference marked thereon, in which—

Figure 1:
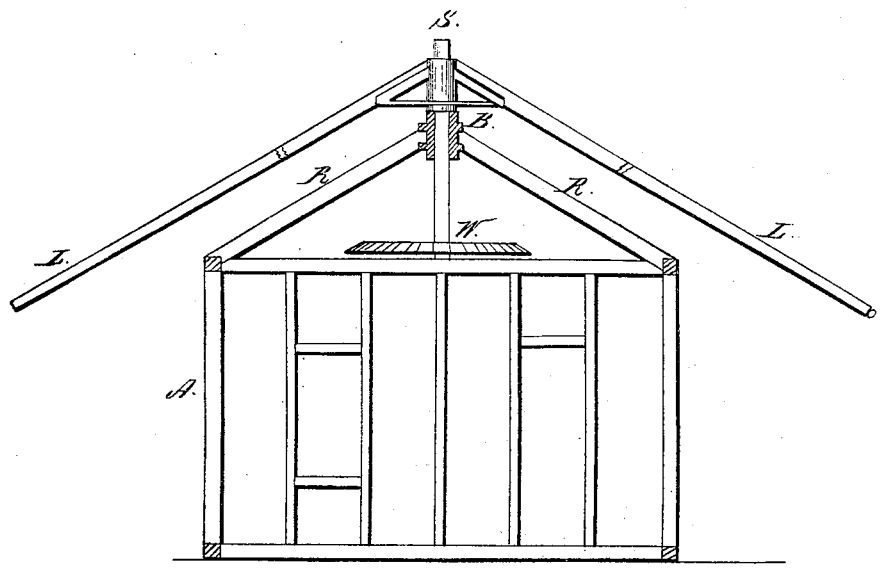
Figure 2:
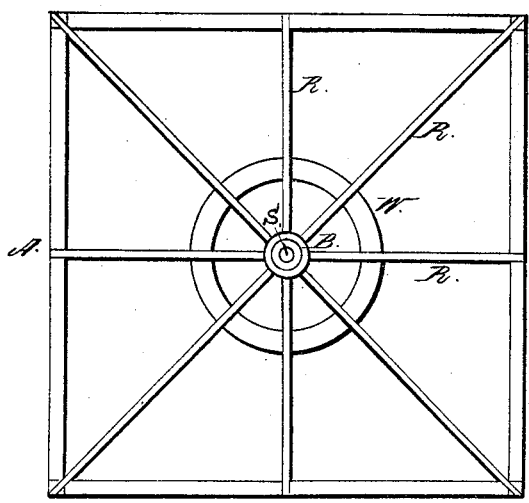

Figure 1 is a vertical, and
Figure 2, a horizontal plan.

This invention relates to an improved method of constructing cotton-gin houses, so that animal power may be more easily introduced than by methods now in use, and at a greatly reduced expense, by permitting the use of a much smaller building than the ones now generally constructed for this purpose, and consists in so adapting the building that the animals used travel around it on the outside and not within it.

To enable those skilled in the art to make and use the same, I will here describe the construction and operation.

A represents the cotton-gin house with a hip roof, or one in which all the rafters meet in a common central point.

At this point is placed a hollow box, B, provided with projections or flanges for the reception and support of the rafters R R R, the space within it being suited to the reception and revolution of the vertical shaft S, to the upper end of which levers, L L, of any convenient form, are attached, and to the bottom of which a gear or other wheel is attached for communicating the power.

I am aware that the method of applying power of animals to machinery placed within their traveled circular path by means of a vertical shaft and levers is very old, and is in use in many forms, such as presses, mills, &c., but am not aware that buildings have ever been so constructed as to render the direct application of this form of power practicable, and also to accomplish the important results attained by this invention.

I do not, therefore, claim this form or means of applying animal power as my invention, but only the arrangement of the building as claimed, to render its application practicable.

What I claim as my invention, and desire to secure by Letters Patent, is—

In combination with the rafters R R R of a hip roof, the hollow box B, placed at their intersection and provided with projections or flanges for the support of the same, the space within the box B being suited to the reception and revolution of a vertical shaft, substantially as herein described and for the purpose set forth.

JAS. M. ALBERTSON.

Witnesses:
H. J. CROCKER,
O. KELTERBORN.